United States Patent
Peng

(10) Patent No.: US 11,555,696 B2
(45) Date of Patent: Jan. 17, 2023

(54) ELECTRONIC TERMINAL, PHOTOGRAPHING METHOD AND DEVICE, AND STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/486,726

(22) Filed: Sep. 27, 2021

(65) Prior Publication Data
US 2022/0299316 A1 Sep. 22, 2022

(51) Int. Cl.
G09G 5/00 (2006.01)
G01B 11/26 (2006.01)
G06F 1/16 (2006.01)

(52) U.S. Cl.
CPC ............ G01B 11/26 (2013.01); G06F 1/1652 (2013.01); G06F 1/1686 (2013.01)

(58) Field of Classification Search
CPC .................. G06F 1/1652; G06F 1/1686; G06F 2203/04102; G09F 9/301; G01B 11/26
See application file for complete search history.

(56) References Cited

U.S. PATENT DOCUMENTS

| 2003/0108236 A1* | 6/2003 | Yoon | G03B 35/20 |
| | | | 348/E13.016 |
| 2011/0117958 A1* | 5/2011 | Kim | G03B 35/10 |
| | | | 455/556.1 |
| 2017/0052566 A1* | 2/2017 | Ka | H04R 3/12 |

FOREIGN PATENT DOCUMENTS

| CN | 108881733 A | * | 11/2018 | ......... H04N 5/23238 |
| CN | 108881733 A | | 11/2018 | |
| CN | 109005286 A | * | 12/2018 | .......... H04M 1/0216 |
| CN | 110266936 A | | 9/2019 | |
| CN | 111355878 A | * | 6/2020 | ........ H04M 1/72454 |
| CN | 111770273 A | * | 10/2020 | .......... H04N 13/239 |
| CN | 111885285 A | * | 11/2020 | .......... H04N 5/2257 |
| CN | 112506386 A | | 3/2021 | |

(Continued)

OTHER PUBLICATIONS

European Patent Application No. 21200274.5, Search and Opinion dated Mar. 29, 2022, 9 pages.

(Continued)

*Primary Examiner* — Joe H Cheng
(74) *Attorney, Agent, or Firm* — Lathrop GPM LLP

(57) ABSTRACT

A terminal such as a folding-screen smartphone includes a first body and a second body; a rotating shaft coupled to the first body and the second body, and configured to change an angle between the first body and the second body through rotation of the rotating shaft. The terminal also includes a first camera in the first body configured to photograph a target object and obtain a first image in response to a photographing instruction and a second camera in the second body configured to photograph the target object and obtain a second image in response to the photographing instruction. A processing component coupled to the first body and the second body is configured to determine the angle between the first body and the second body and obtain a target image by splicing the first image and the second image according to the angle.

20 Claims, 4 Drawing Sheets

(56) References Cited

FOREIGN PATENT DOCUMENTS

WO     WO-2021006388 A1 * 1/2021

OTHER PUBLICATIONS

Chinese Patent Application No. 202110348498.0, Office Action dated May 25, 2022, 6 pages.
Chinese Patent Application No. 202110348498.0, English translation of Office Action dated May 25, 2022, 7 pages.

* cited by examiner

ELECTRONIC TERMINAL, PHOTOGRAPHING METHOD AND DEVICE, AND STORAGE MEDIUM

CROSS-REFERENCE TO RELATED APPLICATIONS

The present application is based on and claims priority to Chinese Patent Application Serial No. 202110348498.0, filed on Mar. 31, 2021, the entire contents of which are incorporated herein by reference.

TECHNICAL FIELD

The present disclosure relates to the field of electronic technology and, more particularly, to an electronic terminal, a photographing method and device, and a storage medium.

BACKGROUND

With the rise in popularity of terminal apparatuses such as smartphones, taking photographs has become one of the most commonly used functions. Generally, when taking pictures, users expect an excellent experience when photographing in certain scenes, such as taking pictures of large objects at a close distance, or photographing a large area of distant scenery. A wide-angle mode of the terminal apparatus supports the above wide-angle photography situations.

The wide-angle mode in the related art is mainly achieved by using an independent wide-angle lens, that is, the hardware of the terminal apparatus itself supports a wider range of photography. However, there are still situations where users wish to acquire an image that the wide-angle lens is not capable of capturing.

SUMMARY

An electronic terminal includes: a first body and a second body; a rotating shaft coupled to the first body and the second body, and configured to change an angle between the first body and the second body through rotation of the rotating shaft; a first camera in the first body configured to obtain a first image by photographing a target object in response to a photographing instruction; a second camera in the second body configured to obtain a second image by photographing the target object in response to the photographing instruction; and a processing component coupled to the first body and the second body, and configured to determine the angle between the first body and the second body and obtain a target image by splicing the first image and the second image according to the angle.

A photographing method is applied to an electronic terminal. The electronic terminal includes: a first body and a second body; a rotating shaft coupled to the first body and the second body, and configured to change an angle between the first body and the second body through rotation of the rotating shaft; a first camera in the first body configured to obtain a first image by photographing a target object in response to a photographing instruction; a second camera in the second body configured to obtain a second image by photographing the target object in response to the photographing instruction; and a processing component coupled to the first body and the second body, and configured to determine the angle between the first body and the second body and obtain a target image by splicing the first image and the second image according to the angle. The method includes: determining the angle between the first body and the second body when it is detected that a photographing mode is started; obtaining the first image by photographing the target object through the first camera and obtaining the second image by photographing the target object through the second camera, in response to detecting a photographing instruction; and obtaining the target image by splicing the first image and the second image according to the angle.

A photographing device includes: a processor; and a storage for storing instructions executable by the processor, in which the processor is configured to execute a photographing method. The method includes: determining the angle between the first body and the second body when it is detected that a photographing mode is started; obtaining the first image by photographing the target object through the first camera and obtaining the second image by photographing the target object through the second camera, in response to detecting a photographing instruction; and obtaining the target image by splicing the first image and the second image according to the angle.

BRIEF DESCRIPTION OF THE DRAWINGS

The accompanying drawings, which are incorporated into and constitute a part of the specification, illustrate embodiments consistent with the present disclosure and, together with the description, serve to explain the principles of the present disclosure.

DETAILED DESCRIPTION

Exemplary embodiments will be described in detail, examples of which are illustrated in the accompanying drawings. The following description refers to the accompanying drawings, and the same numbers in different drawings represent the same or similar elements unless specified otherwise. The implementations set forth in the following description of exemplary embodiments do not represent all implementations consistent with the present disclosure. Instead, they are merely examples of devices and methods consistent with aspects related to the present disclosure as recited in the appended claims.

Figure 1:
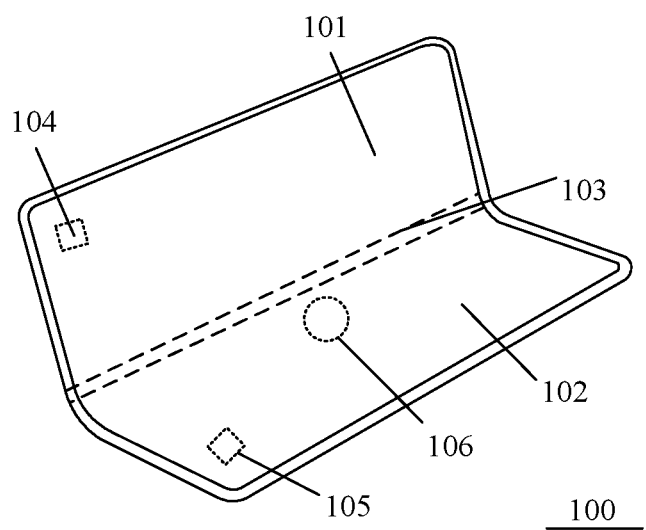
FIG. 1 is a first structural diagram of an electronic terminal in an embodiment of the present disclosure.

FIG. 1 is a first structural diagram of an electronic terminal in an embodiment of the present disclosure. As illustrated in FIG. 1, the terminal 100 includes: a first body 101 and a second body 102; and a rotating shaft 103 coupled to the first body 101 and the second body 102, to change an angle between the first body 101 and the second body 102 through rotation of the rotating shaft 103. A first camera 104 is located in the first body 101 and configured to photograph a target object and obtain a first image in response to a photographing instruction. A second camera 105 is located in the second body 102 and configured to photograph the target object and obtain a second image in response to the photographing instruction. A processing component 106 is coupled to the first body 101 and the second body 102, and configured to determine the angle between the first body 101 and the second body 102 and obtain a target image by splicing the first image and the second image according to the angle.

In the embodiments of the present disclosure, the terminal may be a flip phone with a display screen, a folding-screen phone, or a notebook computer. The terminal has a photographing function, and may be referred to as a photographing terminal in the embodiments of the present disclosure.

The photographing terminal includes the first body 101 and the second body 102. The first body 101 has the first camera 104 therein and the second body has the second camera 105 therein. The angle between the first body 101 and the second body 102 is changed by the rotation of the rotating shaft 103.

It should be noted that in the embodiments of the present disclosure, the first body 101 and the second body 102 may be arranged at an angle ranging from 0 to 180 degrees based on the rotation of the rotating shaft 103, and may also be arranged at an angle ranging from 0 to 360 degrees based on the rotation of the rotating shaft 103. The present disclosure does not limit the range of variation of the angle between the first body 101 and the second body 102 of the photographing terminal.

In the embodiments of the present disclosure, the first camera 104 and the second camera 105 may photograph the same target object in response to the same photographing instruction, to obtain the first image and the second image. For example, the photographing instruction may be a wide-angle photographing instruction commanding wide-angle photographing, and the first camera 104 and the second camera 105 simultaneously photograph the target object based on the photographing instruction, or successively photograph the target object at a predetermined time interval. It should be noted that when the first camera 104 and the second camera 105 take pictures at the predetermined time interval, the predetermined time interval cannot be too long, to avoid a problem that the picture taken by the camera which is started later is different from a predetermined picture due to shaking of the terminal caused by a user's long-time holding. For example, the predetermined time interval may be any duration within 1 second.

It can be understood that the first camera 104 and the second camera 105 may be both front cameras or both rear cameras to photograph the same target object in response to the same photographing instruction. Taking a folding-screen phone as an example, the front camera may be a camera facing the same direction as a display screen for displaying a photographed image, while the rear camera may be a camera facing the opposite direction as the display screen for displaying the photographed image.

It should be noted that in the embodiments of the present disclosure, a field of view (FOV) of the first camera 104 and a field of view of the second camera 105 may be the same or different, which will not be limited in the embodiments of the present disclosure. The field of view refers to an imaging field of view.

In some embodiments, the first body 101 and the second body 102 include a housing of a terminal apparatus, and the first camera 104 and the second camera 105 are on the housing, in which both the first camera 104 and the second camera 105 are rear cameras. For example, for a flip phone with only one display screen, a rear camera is arranged on a flip (the first body 101), and one rear camera is also arranged on another end (the second body 102) coupled to the flip through the rotating shaft.

Figure 2:
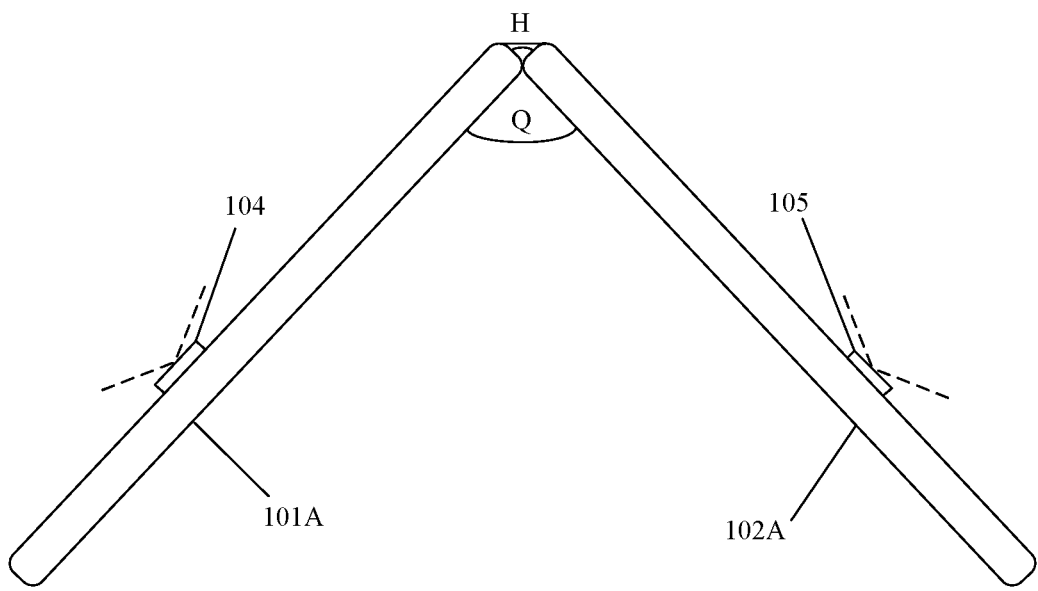
FIG. 2 is a second structural diagram of an electronic terminal in an embodiment of the present disclosure.

In some embodiments, the first body 101 includes a first display screen, and the second body 102 includes a second display screen. The first camera 104 is on a rear surface of the first display screen, and the second camera 105 is on a rear surface of the second display screen. FIG. 2 is a second structural diagram of an electronic terminal in an embodiment of the present disclosure. As illustrated in FIG. 2, the electronic terminal is a folding-screen phone; a rear camera is arranged on the rear surface of the first display screen 101A, and one rear camera is arranged on the rear surface of the second display screen 102A.

In the folding-screen phone illustrated in FIG. 2, an angle Q between the first display screen 101A and the second display screen 102A is changeable. The folding screen may provide a variety of display modes through rotation of the first display screen 101A and the second display screen 102A. For example, when the first display screen 101A and the second display screen 102A are folded together, the first display screen 101 and the second display screen 102 are off, and when the terminal apparatus has an external screen, the external screen is used for display; when the first display screen 101A and the second display screen 102A are unfolded flat, the first display 101 and the second display 102 may act as a full screen to display images together.

Certainly, cameras may be arranged in the first display screen 101 and the second display screen 102 of the folding screen in the present disclosure. For example, the first display screen 101 has an opening in which the first camera 104 is arranged, and the second display screen 102 has an opening in which the second camera 105 is arranged. Both the cameras are referred to as front cameras. The terminal apparatus photographs the same target object by the two front cameras in response to the same photographing instruction.

When the first body 101 and the second body 102 of the photographing terminal are in a non-folded state, that is, the angle between them is not 0 or 360 degrees, the imaging field of view of the first camera 104 in the first body 101 is different from the imaging field of view of the second camera 105 in the second body 102. When the first camera 104 and the second camera 105 photograph the same target object in response to the same photographing instruction to obtain the first image and the second image, if the angle between the first body 101 and the second body 102 causes the imaging fields of view of the two cameras not to overlap, an image with a wider imaging field of view may be obtained by combining the first image and the second image. If the angle between the first body 101 and the second body 102 causes the imaging fields of view of the two cameras to overlap, there will be an overlapping part (i.e., a part with the same content) between the first image and the second image, and even so, an image with a wider imaging field of view can be obtained by combining the first image and the second image.

In this regard, the present disclosure utilizes the processing component 106 included in the terminal apparatus to determine the angle between the first body 101 and the second body 102, and obtain a target image with a wider imaging field of view by splicing the first image and the second image according to the angle.

In some embodiments, a first acceleration sensor 107 is arranged in the first body 101, and a second acceleration sensor 108 is arranged in the second body. The processing component 106 is also configured to determine the angle between the first body 101 and the second body 102 according to data detected by the first acceleration sensor 107 and the second acceleration sensor 108.

Figure 3:
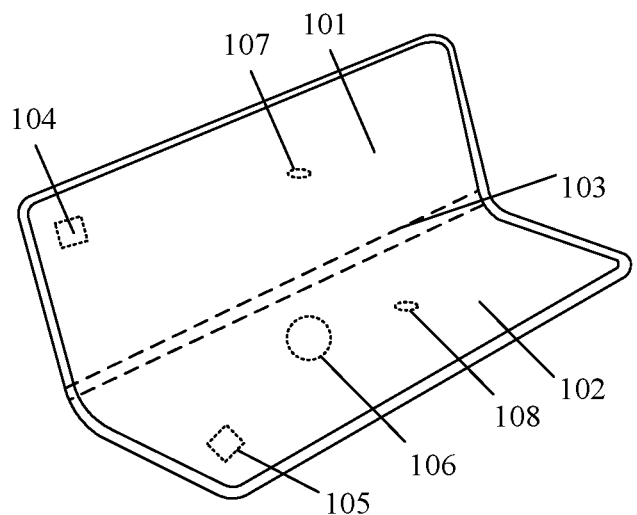
FIG. 3 is a third structural diagram of an electronic terminal in an embodiment of the present disclosure.

FIG. 3 is a third structural diagram of an electronic terminal in an embodiment of the present disclosure. As illustrated in FIG. 3, the first body 101 is provided with the first acceleration sensor 107 therein, and the second body 102 is provided with the second acceleration sensor 108 therein.

In the embodiment of the present disclosure, the processing component 106 may determine the angle between the first body 101 and the second body 102 based on the data detected by the first acceleration sensor 107 and the second acceleration sensor 108.

Figure 4:
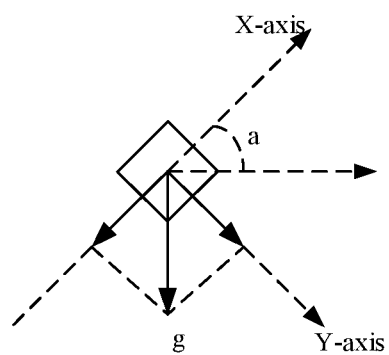
FIG. 4 is a diagram illustrating a principle of obtaining a tilt angle based on acceleration detection data in an embodiment of the present disclosure.

FIG. 4 is a diagram illustrating a principle of obtaining a tilt angle based on acceleration detection data in an embodiment of the present disclosure. As illustrated in FIG. 4, since the acceleration sensor has a gravitational acceleration of 1 g by gravity when placed at rest, components of the gravitational acceleration on X and Y axes may be calculated when the device with the acceleration is tilted, and thus the tilt angle in a vertical plane can be calculated. According to FIG. 4, the component of the gravitational acceleration on the X axis is $AX=g \sin(a)$, the component on the Y axis is $Ay=g \cos(a)$, and thus the tilt angle $a=\tan^{-1}(AX/Ay)$. The tilt angle is an angle relative to the geodetic coordinate system.

Based on the principle illustrated in FIG. 4, the angle between the first body 101 and the second body 102 may be acquired after a tilt angle of the first body 101 and a tilt angle of the second body 102 are obtained.

Certainly, the present disclosure is not limited to the use of acceleration sensors; Hall sensors or other angle sensors may also be used to detect the angle between the first body 101 and the second body 102.

It can be understood that for the photographing terminal of the present disclosure, with the use of the characteristic that an angle may be formed between the first body 101 and the second body 102, cameras are arranged on the first body 101 and the second body 102 to photograph the same target object in response to the same photographing instruction, the processing component 106 can obtain a target image with a wider field of view by splicing the first image and the second image obtained in different fields of view. A special shape of the foldable terminal can be fully utilized, and two cameras are arranged to take pictures which are spliced and become far better than pictures obtained by a single lens. Additionally, compared with a method of obtaining a wide-angle image through a single fixed-focus wide-angle lens, a target image with a wider field of view can be obtained, and since the angle between the first body 101 and the second body 102 can be adjusted, target images with different imaging ranges can be obtained as required, which is more intelligent than the single fixed-focus wide-angle lens.

Figure 5:
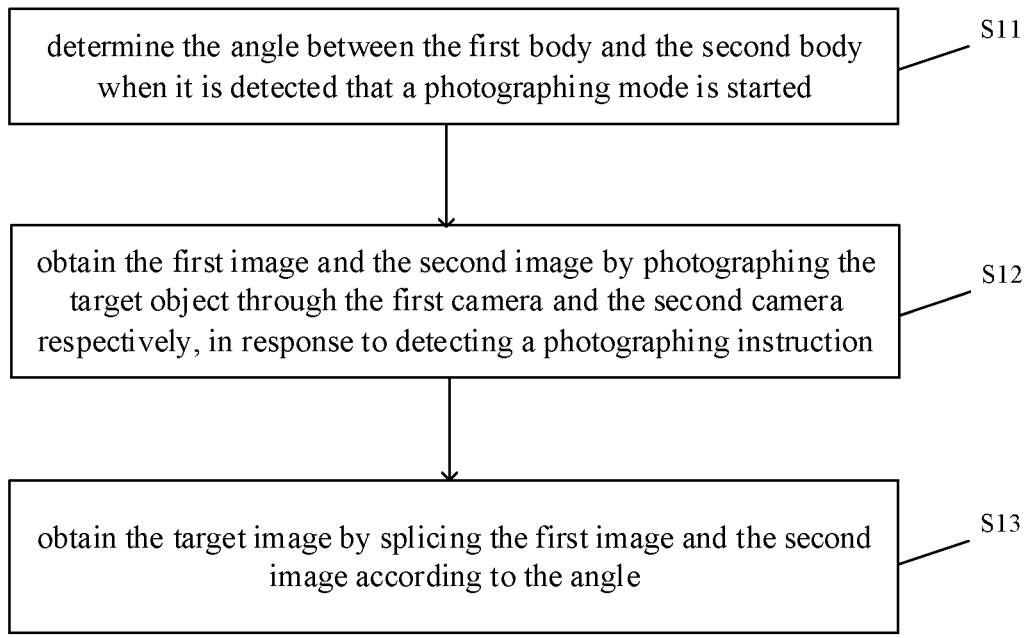
FIG. 5 is a flowchart of a photographing method illustrated in an embodiment of the present disclosure.

FIG. 5 is a flowchart of a photographing method illustrated in an embodiment of the present disclosure. The method is applied to the aforementioned photographing terminal. As illustrated in FIG. 5, the method includes the following steps: S11, determining an angle between the first body and the second body when it is detected that a photographing mode is started; S12, obtaining a first image by photographing a target object through the first camera and obtaining a second image by photographing the target object through the second camera, in response to detecting a photographing instruction; S13, obtaining a target image by splicing the first image and the second image according to the angle.

The method in the embodiment of the present disclosure is applied to the aforementioned photographing terminal. In step S11, the terminal apparatus determines the angle between the first body and the second body; in step S12, in response to the detected photographing instruction, the first camera and the second camera photograph the target object to obtain the first image and the second image. The photographing instruction is, for example, a wide-angle photographing instruction that commands wide-angle photographing. Since the angle between the first body and the second body determines photographing angles of the first camera and the second camera, the imaging field of view of the first camera and the imaging field of view of the second camera are different. As mentioned above, when the first camera and the second camera respond to the same wide-angle photographing instruction and photograph the same target object to obtain the first image and the second image, if the imaging fields of view of the two cameras do not overlap, an image with a wider imaging field of view may be obtained by combining the first image and the second image. However, if the imaging fields of view of the two cameras overlap, there is an overlapping part between the first image and the second image, and even so, an image with a wider imaging field of view can be obtained by combining the first image and the second image.

In this regard, in step S13 of the present disclosure, the first image and the second image are spliced according to the angle between the first display screen and the second display screen, to obtain a target image with a larger field of view and without any repeated content, thereby achieving the wide-angle photographing.

It can be understood that for the photographing terminal of the present disclosure, with the use of the characteristic that an angle may be formed between the first body and the second body, cameras are arranged on the first body and the second body to photograph the same target object in response to the same photographing instruction, such that the photographing terminal can take pictures in different fields of view, and obtain a target image with a wider field of view by splicing the first image and the second image. A special shape of the foldable terminal can be fully utilized, and two cameras are arranged to take pictures which are spliced and become far better than pictures obtained by a single lens. Additionally, compared with a method of obtaining a wide-angle image through a single fixed-focus wide-angle lens, a target image with a wider field of view can be obtained, and since the angle between the first body and the second body can be adjusted, target images with different imaging ranges can be obtained as required, which is more intelligent than the single fixed-focus wide-angle lens.

It should be noted that the purpose of determining the angle between the first body and the second body in the present disclosure is to obtain a target image taken at a wide-angle for subsequent splicing. Therefore, the angle between the first body and the second body being determined after the photographing mode starts enables the determination of the angle to be more consistent with the current photographing scene, such that the image splicing of the first image and the second image may be more accurate. In addition, after splicing the first image and the second image to obtain the target image, the first display screen and the second display screen of the terminal may be utilized to jointly display the spliced target image.

In some embodiments, obtaining the target image by splicing the first image and the second image according to the angle, includes: determining an overlapping angle between a first field of view of the first camera and a second field of view of the second camera when the angle satisfies an angle threshold condition; determining an overlapping part between the first image and the second image according to the overlapping angle; and obtaining the target image by removing the overlapping part and splicing the first image and the second image according to the overlapping part.

In the present embodiment, since the fields of view of the first camera and the second camera are known, the terminal apparatus may determine the overlapping angle between the first field of view of the first camera and the second field of view of the second camera in combination with the angle between the first body and the second body, and the overlapping part in the first image and the second image may be obtained based on the overlapping angle. After determining the overlapping part, the terminal apparatus may splice the first image and the second image after removing the overlapping part according to the overlapping part.

Figure 6:
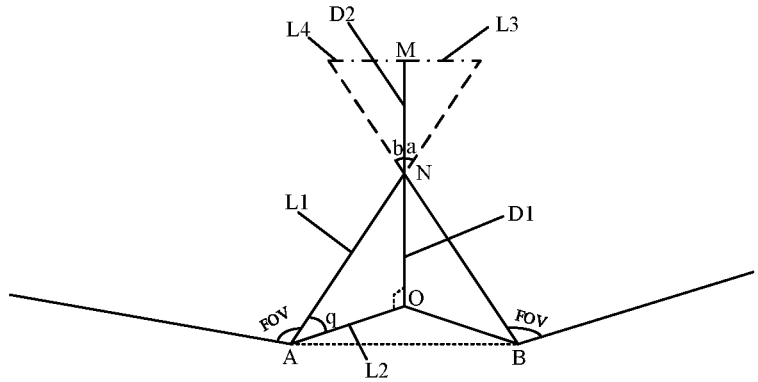
FIG. 6 is a diagram illustrating a principle of determining overlapping part based on an overlapping angle in an embodiment of the present disclosure.

FIG. 6 is a diagram illustrating a principle of determining overlapping part based on an overlapping angle in an embodiment of the present disclosure. As illustrated in FIG. 6, A is the first camera, B is the second camera, a plane where AOB is located is a projection plane of the terminal, OA and OB can be understood as distance from a camera to a rotating shaft (known distance). As illustrated in FIG. 2, OA can be understood as the distance from the first camera 104 to point H, OB can be understood as the distance from the second camera 105 to point H. In FIG. 5, M is a photographing target, based on the fields of view of the camera A and the camera B, and sum of the angles of a and b is the overlapping angle of the first camera and the second camera.

Since the fields of view of the camera A and the camera B are known, the distance between the target object and the terminal when fields of view do not overlap may be calculated according to the known two fields of view, which is the distance D1 between ON in FIG. 5. Since NO is perpendicular to OA and OA values are known, and the angle q is the angle between boundary of the field of view of the camera A and the first body (which may be calculated according to the field of view of the camera A), the distance dl when the fields of view do not overlap may be calculated according to the trigonometric function. Based on the calculated angle q, an angle a may also be obtained. Similarly, an angle b may also be obtained based on the camera B, and that is, the overlapping angle may be determined.

Generally, a distance sensor is arranged in the terminal, such that the terminal may obtain the distance between the photographing target M and the terminal, i.e., the distance between OM in FIG. 5. Based on the distance between OM and D1, the distance D2 between MN may be obtained, and based on the angle a, an overlapping length L3 of the field of view may be obtained by trigonometric function. Similarly, based on angle b, an overlapping length L4 may be obtained, and sum of L3 and L4 is the overlapping distance of the field of view corresponding to the overlapping angle. Assuming that width of the image taken by the terminal is K, product of (L3+L4) and 1/K is the overlapping part of the first image and the second image.

It should be noted that in the embodiments of the present disclosure, the angle threshold condition is determined according to the fields of view of the first camera and the second camera and the required wide-angle photographing amplitude, which is not specifically limited in the present disclosure.

Taking the folding screen illustrated in FIG. 2 as an example, both the first camera and the second camera are the rear cameras. When the angle Q between the first display screen 101A on the first body and the second display screen 102A on the second body is greater than 60 degrees and less than 120 degrees, indicating that the angle threshold condition is met, and thus the overlapping angle between the first field of view of the first camera and the second field of view of the second camera is determined.

When both the first camera and the second camera are the rear cameras, based on the fields of view of the first camera and the second camera, if the angle Q is less than or equal to 60 degrees, the first camera and the second camera may not have overlapping field of view, such that the continuity of image content during wide-angle photographing cannot be achieved (for example, the same target object cannot be photographed); if the angle Q is greater than or equal to 180 degrees, the overlapping of the fields of view of the first camera and the second camera may be too high to obtain the target image with a wider field of view. The above two cases cannot meet users' photographing requirement.

In the case where both the first camera and the second camera are the front cameras, contrary to the case with the external cameras, which will not be described in the embodiments of the present disclosure in detail.

In an image splicing solution, the overlapping part in the first image and the second image is determined by image registration. For example, after the image registration based on the extracted scale invariant feature transform (SIFT) in the first image and the second image, the overlapping part is then determined.

However, the manner based on the image registration has a large amount of calculation, thereby affecting speed of the image splicing, which cannot be applied to mobile terminals (such as phones) with limited computing power. In the present disclosure, the overlapping part in the first image and the second image is finally determined by combining the angle between the first body and the second body and the field of view of the first camera and the second camera, which reduces the amount of calculation, may improve the speed of image splicing, and may be applied to mobile terminals with limited calculation capacity.

In some embodiments, when the overlapping part is removed and the first image and the second image are spliced according to the overlapping part, the first image with the overlapping part removed may be directly spliced with the second image after the overlapping part is removed from the first image, to obtain the target image. Certainly, the target image may also be obtained by splicing the second image with the first image after the overlapping part is removed from the second image.

In other embodiments, obtaining the target image by removing the overlapping part and splicing the first image and the second image according to the overlapping part, includes: obtaining a fused image by performing image fusion on the overlapping part between the first image and the second image; and obtaining the target image by splicing a remaining part in the first image and the second image except for the overlapping part, and the fused image.

In the present embodiment, instead of directly removing the overlapping part in the first image or the second image, the overlapping parts in the first image and the second image are fused to obtain a fused image with better quality. For example, for the overlapping part, a fused image with more detail information (such as clearer edge and texture) is obtained by means of pixel-level image fusion.

The present disclosure is based on a part other than the overlapping portion in the first image and the second image, and the fused image, to perform a splicing process to obtain the target image. It should be noted that when splicing, edge of the spliced part may be smoothed to obtain a smoother target image.

It can be understood that the present disclosure may improve the image quality of the target image finally spliced by performing image fusion processing on the overlapping part.

In some embodiments, the method further includes outputting a prompt message that image splicing cannot be performed when the angle does not satisfy the angle threshold condition.

In the present embodiment, taking the rear camera as an example, if the angle between the first body and the second body is less than or equal to the angle threshold, indicating that in the case of the angle, there may be no angle overlapping between the first field of view of the first camera and the second field of view of the second camera, such that there is no overlapping part in the first image and the second image, and the terminal apparatus outputs a prompt message that image splicing cannot be performed. For example, the prompt message is output by voice broadcast, or the information is displayed on the first display screen and/or the second display screen to prompt that the image splicing cannot be performed.

It should be noted that in the embodiments of the present disclosure, if the first field of view of the first camera and the second field of view of the second camera do not overlap, the first image and the second image may also be directly spliced to obtain a target image with a wider field of view compared to that of the first image or the second image.

In some embodiments, obtaining a target image photographed at a wide angle by splicing the first image and the second image according to the angle includes: obtaining a third image by splicing the first image and the second image according to the angle; and obtaining the target image by performing distortion correction on the third image.

In the present embodiment, since the angle between the first body and the second body may make the target object tilted relative to the first camera and the second camera, the first image and the second image obtained by photographing may be distorted. For this, after splicing the first image and the second image, distortion correction is performed to the third image to obtain the target image. For example, the terminal apparatus may correct the third image based on the preset distortion correction model, and distortion coefficient in the distortion correction model is determined during calibration of the first camera and the second camera.

It can be understood that by correcting the distortion of the third image, the present disclosure may obtain a target image with a larger field of view with better quality and improve the user's experience.

It should be noted that in the embodiments of the present disclosure, taking the folding screen as an example, when the terminal apparatus is displaying the image, posture of the folding screen will be determined in advance to determine how to display the image. When the posture of the folding screen is determined, one of the manners is to determine the angle between the first display screen and the second display screen at intervals of a predetermined time interval, and then determine the posture of the folding screen according to the angle. Thus, in some embodiments, the terminal apparatus may determine the angle between the first display screen and the second display screen at intervals of a predetermined time interval.

Figure 7:
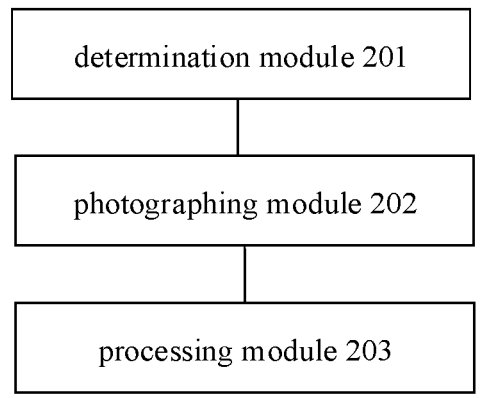
FIG. 7 illustrates a photographing device according to an exemplary embodiment.

FIG. 7 illustrates a photographing device according to an exemplary embodiment. Referring to FIG. 7, when applied to the above photographing terminal, the photographing device includes: a determining module 201 configured to determine the angle between the first body and the second body when it is detected that a photographing mode is started; a photographing module 202 configured to obtain the first image by photographing the target object through the first camera and obtain the second image by photographing the target object through the second camera in response to detecting a photographing instruction; and a processing module 203 configured to obtain the target image by splicing the first image and the second image according to the angle.

In some embodiments, the processing module 203 is also configured to determine an overlapping angle between a first field of view of the first camera and a second field of view of the second camera when the angle satisfies an angle threshold condition; determine an overlapping part between the first image and the second image according to the overlapping angle; and obtain the target image by removing the overlapping part and splicing the first image and the second image according to the overlapping part.

In some embodiments, the processing module 203 is also configured to obtain a fused image by performing image fusion on the overlapping part between the first image and the second image; and obtain the target image by splicing a remaining part in the first image and the second image except for the overlapping part, and the fused image.

In some embodiments, the device further includes: an output module 204 configured to output a prompt message that image splicing cannot be performed when the angle does not satisfy the angle threshold condition.

In some embodiments, the processing module 203 is also configured to obtain a third image by splicing the first image and the second image according to the angle; and obtaining the target image by performing distortion correction on the third image.

As for the device in the above embodiments, the specific manners of operation performed by each module has been described in detail in the embodiments of the method, which will not be described in detail here.

Figure 8:
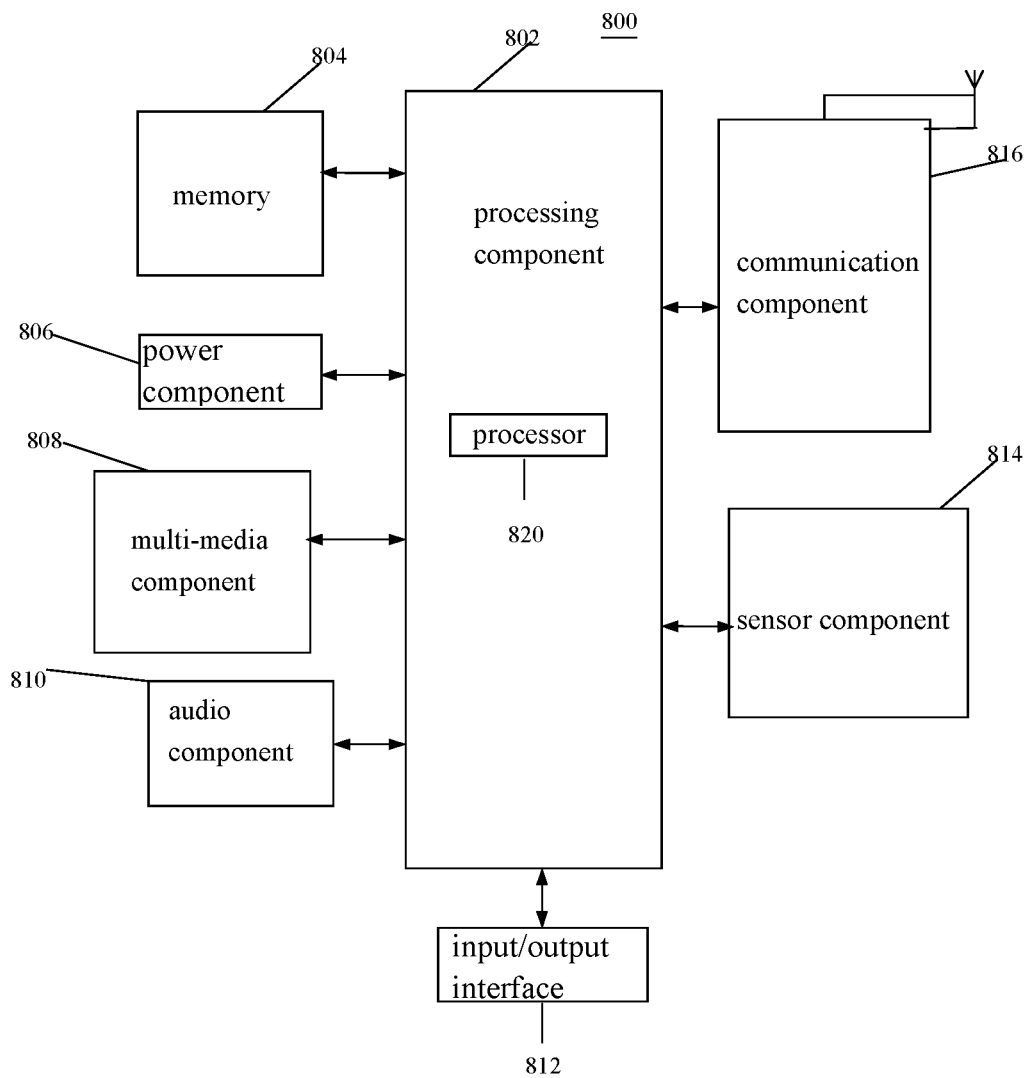
FIG. 8 is a block diagram of a terminal illustrated in an embodiment of the present disclosure.

FIG. 8 is a block diagram of a terminal apparatus 800 illustrated according to an exemplary embodiment. For example, the device 800 may be a folding-screen phone.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of device 800, such as operations associated with display, telephone calls, data communication, camera operations, and recording operations. The processing component 802 may include one or more processors 820 to execute instructions to perform all or part of the steps of the above-described method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium enables a photographing terminal to execute a photographing method when an instruction in the storage medium is executed by a processor of the photographing terminal. The method includes: determining the angle between the first body and the second body when it is detected that a photographing mode is started; obtaining the first image by photographing the target object through the first camera and obtaining the second image by photographing the target object through the second camera, in response to detecting a photographing instruction; and obtaining the target image by splicing the first image and the second image according to the angle.

Other embodiments of the present disclosure will be apparent to those skilled in the art from consideration of the specification and practice of the present disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact constructions described above and illustrated in the accompanying drawings, and various modifications and changes can be made without departing from the scope thereof. The scope of the present disclosure is only limited by the appended claims.

What is claimed is:

1. An electronic terminal, comprising:
a first body and a second body;
a rotating shaft coupled to the first body and the second body, and configured to change an angle between the first body and the second body through rotation of the rotating shaft;
a first camera in the first body configured to obtain a first image by photographing a target object in response to a photographing instruction;
a second camera in the second body configured to obtain a second image by photographing the target object in response to the photographing instruction; and
a processing component coupled to the first body and the second body, and configured to determine the angle between the first body and the second body and obtain a target image by splicing the first image and the second image according to the angle.

2. The electronic terminal according to claim 1, wherein:
the first body comprises a first display screen, and the second body comprises a second display screen;
the first camera is on a rear surface of the first display screen, and the second camera is on a rear surface of the second display screen.

3. The electronic terminal according to claim 2, wherein the first display screen has an opening in which the first camera is arranged, and the second display screen has an opening in which the second camera is arranged.

4. The electronic terminal according to claim 2, wherein when the first display screen and the second display screen are folded together, the first display screen and the second display screen are off.

5. The electronic terminal according to claim 2, wherein when the first display screen and the second display screen are unfolded flat, the first display screen and the second display screen may act as a full screen to display images.

6. The electronic terminal according to claim 1, wherein:
a first acceleration sensor is arranged in the first body, and a second acceleration sensor is arranged in the second body;
the processing component is configured to determine the angle between the first body and the second body according to data detected by the first acceleration sensor and the second acceleration sensor.

7. The electronic terminal according to claim 1, wherein the first body and the second body comprise a housing of a terminal apparatus, and the first camera and the second camera are on the housing.

8. The electronic terminal according to claim 1, wherein the angle between the first body and the second body is acquired after a tilt angle of the first body and a tilt angle of the second body are obtained.

9. A photographing method applied to an electronic terminal, wherein the electronic terminal comprises:
a first body and a second body;
a rotating shaft coupled to the first body and the second body, and configured to change an angle between the first body and the second body through rotation of the rotating shaft;
a first camera in the first body configured to obtain a first image by photographing a target object in response to a photographing instruction;
a second camera in the second body configured to obtain a second image by photographing the target object in response to the photographing instruction; and
a processing component coupled to the first body and the second body, and configured to determine the angle between the first body and the second body and obtain a target image by splicing the first image and the second image according to the angle,
wherein the photographing method comprises:
determining the angle between the first body and the second body when it is detected that a photographing mode is started;
obtaining the first image by photographing the target object through the first camera and obtaining the second image by photographing the target object through the second camera, in response to detecting a photographing instruction; and
obtaining the target image by splicing the first image and the second image according to the angle.

10. The photographing method according to claim 9, wherein obtaining the target image by splicing the first image and the second image according to the angle, comprises:
determining an overlapping angle between a first field of view of the first camera and a second field of view of the second camera when the angle satisfies an angle threshold condition;
determining an overlapping part between the first image and the second image according to the overlapping angle; and
obtaining the target image by removing the overlapping part and splicing the first image and the second image according to the overlapping part.

11. The photographing method according to claim 10, wherein obtaining the target image by removing the overlapping part and splicing the first image and the second image according to the overlapping part, comprises:
obtaining a fused image by performing image fusion on the overlapping part between the first image and the second image; and
obtaining the target image by splicing a remaining part in the first image and the second image except for the overlapping part, and the fused image.

12. The photographing method according to claim 10, further comprising:
outputting a prompt message that image splicing cannot be performed when the angle does not satisfy the angle threshold condition.

13. The photographing method according to claim 9, wherein obtaining the target image by splicing the first image and the second image according to the angle, comprises:
obtaining a third image by splicing the first image and the second image according to the angle; and
obtaining the target image by performing distortion correction on the third image.

14. The photographing method according to claim 9, wherein:
the first body comprises a first display screen, and the second body comprises a second display screen;
the first camera is on a rear surface of the first display screen, and the second camera is on a rear surface of the second display screen.

15. The photographing method according to claim 9, wherein:
a first acceleration sensor is arranged in the first body, and a second acceleration sensor is arranged in the second body;
the processing component is configured to determine the angle between the first body and the second body according to data detected by the first acceleration sensor and the second acceleration sensor.

16. A photographing device, comprising:
a processor; and
a storage for storing instructions executable by the processor;
wherein the processor is configured to execute a photographing method, comprising:
determining the angle between the first body and the second body when it is detected that a photographing mode is started;
obtaining the first image by photographing the target object through the first camera and obtaining the second image by photographing the target object through the second camera, in response to detecting a photographing instruction; and
obtaining the target image by splicing the first image and the second image according to the angle.

17. The photographing device according to claim 16, wherein obtaining the target image by splicing the first image and the second image according to the angle, comprises:
determining an overlapping angle between a first field of view of the first camera and a second field of view of the second camera when the angle satisfies an angle threshold condition;
determining an overlapping part between the first image and the second image according to the overlapping angle; and
obtaining the target image by removing the overlapping part and splicing the first image and the second image according to the overlapping part.

18. The photographing device according to claim 17, wherein obtaining the target image by removing the overlapping part and splicing the first image and the second image according to the overlapping part, comprises:
obtaining a fused image by performing image fusion on the overlapping part between the first image and the second image; and
obtaining the target image by splicing a remaining part in the first image and the second image except for the overlapping part, and the fused image.

19. The photographing device according to claim 17, further comprising:
outputting a prompt message that image splicing cannot be performed when the angle does not satisfy the angle threshold condition.

20. The photographing device according to claim 16, wherein obtaining the target image by splicing the first image and the second image according to the angle, comprises:
obtaining a third image by splicing the first image and the second image according to the angle; and
obtaining the target image by performing distortion correction on the third image.

* * * * *